United States Patent
Nozhchev

(10) Patent No.: US 10,936,694 B2
(45) Date of Patent: Mar. 2, 2021

(54) METHODS AND APPARATUS TO ANALYZE TELEMETRY DATA IN A NETWORKED COMPUTING ENVIRONMENT

(71) Applicant: VMware Inc., Palo Alto, CA (US)

(72) Inventor: Marin Nozhchev, Sofia (BG)

(73) Assignee: VMWARE, INC, Palo Alto, CA (US)

( * ) Notice: Subject to any disclaimer, the term of this patent is extended or adjusted under 35 U.S.C. 154(b) by 357 days.

(21) Appl. No.: 15/952,997

(22) Filed: Apr. 13, 2018

(65) Prior Publication Data
US 2019/0318039 A1  Oct. 17, 2019

(51) Int. Cl.
| | |
|---|---|
| *G06F 16/00* | (2019.01) |
| *G06F 16/957* | (2019.01) |
| *H04L 9/08* | (2006.01) |
| *G06N 5/02* | (2006.01) |
| *G06F 16/951* | (2019.01) |
| *G06F 16/25* | (2019.01) |

(52) U.S. Cl.
CPC ........ *G06F 16/9577* (2019.01); *G06F 16/256* (2019.01); *G06F 16/951* (2019.01); *G06N 5/02* (2013.01); *H04L 9/0894* (2013.01)

(58) Field of Classification Search
CPC .................................................. G06F 16/256
See application file for complete search history.

(56) References Cited

U.S. PATENT DOCUMENTS

2016/0330182 A1* 11/2016 Jeon ..................... H04L 63/062
2018/0324204 A1   11/2018 McClory et al.

OTHER PUBLICATIONS

United States Patent and Trademark Office, "Non-Final Office Action," issued in connection with U.S. Appl. No. 16/037,684, dated Sep. 15, 2020, 6 pages.

* cited by examiner

*Primary Examiner* — Ajith Jacob
(74) *Attorney, Agent, or Firm* — Hanley, Flight & Zimmerman, LLC

(57) ABSTRACT

Methods, apparatus, systems and articles of manufacture are disclosed for analyzing telemetry data in a networked computing environment. An example apparatus includes a client data datastore to store telemetry data and a first secret, the telemetry data and the first secret received from first computing environment; a client data analyzer to: apply a previously trained model to the telemetry data to determine an analysis result; and store the analysis result in association with the first secret; and a result interface to, in response to a request including a second secret: retrieve the stored result associated with the first secret that matches the second secret; transmit the stored results to the source of the request.

21 Claims, 7 Drawing Sheets

METHODS AND APPARATUS TO ANALYZE TELEMETRY DATA IN A NETWORKED COMPUTING ENVIRONMENT

FIELD OF THE DISCLOSURE

This disclosure relates generally to computing environments, and, more particularly, to methods and apparatus to analyze telemetry data in networked computing environments.

BACKGROUND

Virtualizing computer systems provides benefits such as the ability to execute multiple computer systems on a single hardware computer, replicating computer systems, moving computer systems among multiple hardware computers, and so forth. "Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

In recent years, networked computing environments such as virtualized computing environments, physical computing environments, and hybrid computing environments, have grown in power and also complexity. One such type of networked computing environment is a cloud computing environment. Cloud computing environments may be composed of many processing units (e.g., servers, computing resources, etc.). The processing units may be installed in standardized frames, known as racks, which provide efficient use of floor space by allowing the processing units to be stacked vertically. The racks may additionally include other components of a cloud computing environment such as storage devices, networking devices (e.g., routers, switches, etc.), etc.

DETAILED DESCRIPTION

Figure 1:
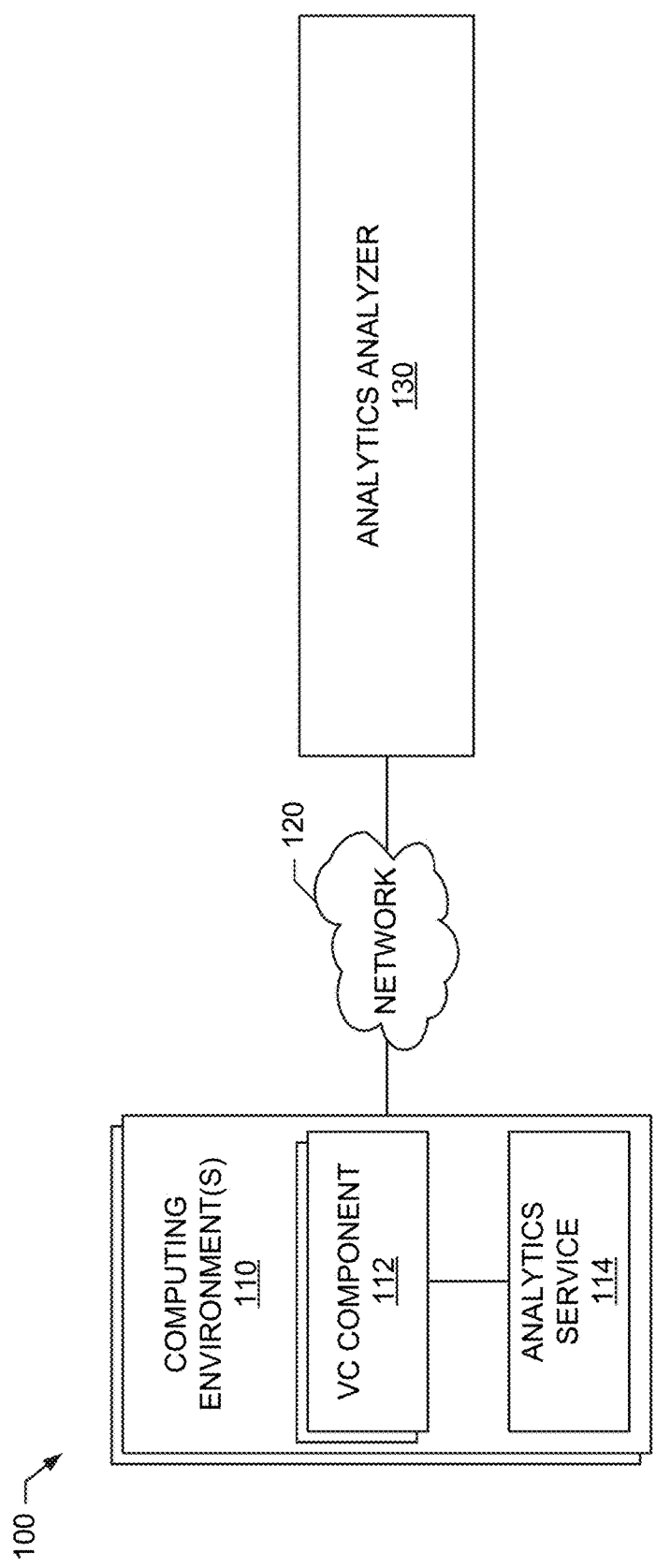
FIG. 1 is a block diagram of an example environment in which a cloud computing environment operates.

As the complexity of cloud computing environments has grown, the complexity of managing such environments has increased. To diagnose errors and manage cloud computing environments, telemetry data about the operation (e.g., performance statistics, configuration information, device information, etc.) may be collected. In some prior systems, telemetry data from a computing environment may be collected and analyzed. However, such analysis does not reveal information about the global use of similar computing systems and components (e.g., about the operation of virtual computing components in a multitude of computing environments).

Methods and apparatus disclosed herein transmit the telemetry information to a central facility (e.g., a facility hosted by a cloud computing system provider). In some examples, the central facility hosts applications that analyze the telemetry information to provide a report. In some examples, the report is made available quickly after the telemetry data is reported (e.g., in less than 10 minutes). In some examples, the telemetry data is transmitted to the central facility with a secret (e.g., a password, a passkey, a digital certificate, a pre-shared key, etc.). In addition to providing a report, the collected telemetry data is collected in a datastore (e.g., a database) for batch processing. In some examples, the batch processing periodically trains a machine learning model that is provided to the applications for analyzing the telemetry data to provides the report.

Cloud computing is based on the deployment of many physical resources across a network, virtualizing the physical resources into virtual resources, and provisioning the virtual resources in software defined data centers (SDDCs) for use across cloud computing services and applications. Examples described herein can be used to manage network resources in SDDCs to improve performance and efficiencies of network communications between different virtual and/or physical resources of the SDDCs.

Examples described herein can be used in connection with different types of SDDCs. In some examples, techniques described herein are useful for managing network resources that are provided in SDDCs based on Hyper-Converged Infrastructure (HCI). In some examples, HCI combines a virtualization platform such as a hypervisor, virtualized software-defined storage, and virtualized networking in an SDDC deployment. An SDDC manager can provide automation of workflows for lifecycle management and operations of a self-contained private cloud instance. Such an instance may span multiple racks of servers connected via a leaf-spine network topology and connects to the rest of the enterprise network for north-south connectivity via well-defined points of attachment. The leaf-spine network topology is a two-layer data center topology including leaf switches (e.g., switches to which servers, load balancers, edge routers, storage resources, etc., connect) and spine switches (e.g., switches to which leaf switches connect, etc.). In such a topology, the spine switches form a backbone of a network, where every leaf switch is interconnected with each and every spine switch.

Examples described herein can be used with one or more different types of virtualization environments. Three example types of virtualization environments are: full virtualization, paravirtualization, and operating system (OS) virtualization. Full virtualization, as used herein, is a virtualization environment in which hardware resources are managed by a hypervisor to provide virtual hardware resources to a virtual machine (VM). In a full virtualization environment, the VMs do not have access to the underlying hardware resources. In a typical full virtualization, a host OS with embedded hypervisor (e.g., a VMWARE® ESXI® hypervisor, etc.) is installed on the server hardware. VMs including virtual hardware resources are then deployed on the hypervisor. A guest OS is installed in the VM. The hypervisor manages the association between the hardware resources of the server hardware and the virtual resources allocated to the VMs (e.g., associating physical random-access memory (RAM) with virtual RAM, etc.). Typically, in full virtualization, the VM and the guest OS have no visibility and/or access to the hardware resources of the underlying server. Additionally, in full virtualization, a full guest OS is typically installed in the VM while a host OS is installed on the server hardware. Example virtualization environments include VMWARE® ESX® hypervisor, Microsoft HYPER-V® hypervisor, and Kernel Based Virtual Machine (KVM).

Paravirtualization, as used herein, is a virtualization environment in which hardware resources are managed by a hypervisor to provide virtual hardware resources to a VM, and guest OSs are also allowed to access some or all the underlying hardware resources of the server (e.g., without accessing an intermediate virtual hardware resource, etc.). In a typical paravirtualization system, a host OS (e.g., a Linux-based OS, etc.) is installed on the server hardware. A hypervisor (e.g., the XEN® hypervisor, etc.) executes on the host OS. VMs including virtual hardware resources are then deployed on the hypervisor. The hypervisor manages the association between the hardware resources of the server hardware and the virtual resources allocated to the VMs (e.g., associating RAM with virtual RAM, etc.). In paravirtualization, the guest OS installed in the VM is configured also to have direct access to some or all of the hardware resources of the server. For example, the guest OS can be precompiled with special drivers that allow the guest OS to access the hardware resources without passing through a virtual hardware layer. For example, a guest OS can be precompiled with drivers that allow the guest OS to access a sound card installed in the server hardware. Directly accessing the hardware (e.g., without accessing the virtual hardware resources of the VM, etc.) can be more efficient, can allow for performance of operations that are not supported by the VM and/or the hypervisor, etc.

OS virtualization is also referred to herein as container virtualization. As used herein, OS virtualization refers to a system in which processes are isolated in an OS. In a typical OS virtualization system, a host OS is installed on the server hardware. Alternatively, the host OS can be installed in a VM of a full virtualization environment or a paravirtualization environment. The host OS of an OS virtualization system is configured (e.g., utilizing a customized kernel, etc.) to provide isolation and resource management for processes that execute within the host OS (e.g., applications that execute on the host OS, etc.). The isolation of the processes is known as a container. Thus, a process executes within a container that isolates the process from other processes executing on the host OS. Thus, OS virtualization provides isolation and resource management capabilities without the resource overhead utilized by a full virtualization environment or a paravirtualization environment. Example OS virtualization environments include Linux Containers LXC and LXD, the DOCKER™ container platform, the OPENVZ™ container platform, etc.

In some examples, a data center (or pool of linked data centers) can include multiple different virtualization environments. For example, a data center can include hardware resources that are managed by a full virtualization environment, a paravirtualization environment, an OS virtualization environment, etc., and/or a combination thereof. In such a data center, a workload can be deployed to any of the virtualization environments. In some examples, techniques to monitor both physical and virtual infrastructure, provide visibility into the virtual infrastructure (e.g., VMs, virtual storage, virtual or virtualized networks and their control/management counterparts, etc.) and the physical infrastructure (e.g., servers, physical storage, network switches, etc.).

FIG. 1 is a block diagram of an example environment 100 in which a computing environment 110 operates. According to the illustrated example, the computing environment 110 is coupled, via a network 120, to an analytics analyzer 130 (e.g., a central facility). The example analytics analyzer 130 collects telemetry data from the example computing environment 110, analyzes the data, and provides reports regarding the analysis.

The example computing environment 110 is an SDDC that includes virtual computing component(s) 112 to provide virtual computing resources for executing a workload. According to the illustrated example, the computing environment 110 includes an analytics service 114 to collect and analyze information about the operation of the example virtual computing component(s) 112.

The computing environment 110 may include any combination of physical and virtual computing resources. According to the illustrated example, the environment 100 includes a plurality of computing environments 110. For example, the plurality of computing environments 110 may form a public or private cloud. Additionally or alternatively, the plurality of computing environments 110 may be any combination of linked and unlinked environments. For example, a group of the computing environments 110 may form a cloud run by a first entity while another of the computing environments 110 may be run by a second entity.

According to the illustrated example, the virtual computing component(s) 112 are subsystems of a virtual computing environment for implementing the computing environment 110. The example virtual computing component(s) 112 provide various services to provide functionality to the computing environment 110. For example, the virtual computing component(s) 112 may provide virtual storage functionality, virtual networking functionality, distributed computing functionality, high availability functionality, etc. While the illustrated example, includes multiple virtual computing components 112 to provide the various functionality, a single virtual computing component may, alternatively, provide multiple functionalities to the computing environment 110. Additionally or alternatively, the virtual computing component(s) 112 may provide functionality to physical computing components (e.g., device management, device monitoring, networking connectivity, etc.). Likewise, the virtual computing component(s) may be implemented by hardware (e.g., a router, a gateway, a switch, a storage device, etc.), software, or any combination of hardware and software.

The example analytics service 114 collects telemetry information about operation of the example virtual computing component(s) 112 and transmits the telemetry information to the example analytics analyzer 130 via the example network 120. The telemetry information may include performance information (e.g., statistics, metrics, etc.) about the operation of the virtual computing component(s) 112, configuration of the virtual computing component(s) 112 (e.g., configuration settings, identification and configuration information about underlying hardware components, etc.), and/or any other information about the virtual computing component(s) 112.

According to the illustrated example the analytics service 114 packages the collected telemetry into a structured format for transmission to the example analytics analyzer 130. The example analytics service 114 packages the telemetry information in Common Data Format (CDF) using JavaScript Object Notation (JSON). Alternatively, any other type of data structure may be utilized such as, for example, a key-value structure, an extensible markup language (XML) structure, etc. When sending the telemetry information to the example analytics analyzer 130, the example analytics service 114 includes a security component to ensure that the telemetry information and analysis results generated using the telemetry information are only available to the source analytics service 114 that transmitted the telemetry information. For example, the security component may be a password, a certificate (e.g., a digital certificate), a digital key, a secret, a pre-shared key, etc.

The example analytics service 114 determines the telemetry information to collect based on a configuration file (e.g., an XML configuration file). The example analytics service 114 retrieves the configuration file from the analytics analyzer 130 via the example network 120. By providing the configuration file from the analytics analyzer 130 the configuration file can be modified by system engineers, developers, etc. of the analytics analyzer 130 to control what telemetry information is collected. For example, if a developer wishes to know how a particular virtual computing component 112 is operating on a particular storage device, the configuration file can be modified to include a request for the analytics service 114 to collect operation information for one of the virtual computing components 112 that provides a storage service and to collect identification information (e.g., model numbers) of storage devices in use. Additionally or alternatively, the configuration file may be generated and/or modified locally in the computing environment 110.

In addition to collecting telemetry information, the example analytics service 114 facilitates reporting on analysis of the telemetry information. For example, the analytics service 114 periodically polls the example analytics analyzer 130 using the security component used when transmitting telemetry information to determine if any analysis results, reports, etc. are available. When results and/or reports are available, the analytics service 114 retrieves the results and/or reports and presents them to a user (e.g., transmits the results and/or reports in a message, displays the results and/or reports, etc.).

The example network 120 of the illustrated example is the Internet. Alternatively, the network 120 may be any combination of public and private networks. For example, the network 120 may include one or more of public networks, private network, local area networks, wide area networks, virtual private networks, wired networks, wireless networks, etc.

The analytics analyzer 130 collects the telemetry information from the example analytics service 114 to provide to provide streaming analysis and batch analysis. The example streaming analysis provides a rapid response (e.g., less than 1 second latency, less than 1 minute latency, etc.) by analyzing a particular telemetry information package received from the example analytics service 114. The example batch analysis analyzes multiple telemetry information packages (e.g., all telemetry information received from a particular one of the analytics service 114, all telemetry information received from a plurality of analytics services 114 associated with a particular one of the computing environments 110, all telemetry information received from all connected analytics services 114 (e.g., cross-deployment data from all clients of the analytics analyzer 130), etc.). According to the illustrated example, a machine learning model generated, trained, and/or retrained by the batch analysis is provided for use during the streaming analysis. Results from the analyses are provided to the example analytics service 114 (e.g., results of the streaming analysis of telemetry information received from one of the analytics service 114 are provided to that analytics service 114) and/or to other entities associated with the analytics analyzer 130 (e.g., streaming and/or batch analysis results may be provided to developers, administrators of the analytics analyzer 130, system engineers, etc.

In operation of the example environment 100, the example analytics services 114 retrieves a configuration file from the example analytics analyzer 130 via the example network 120. The example analytics service 114 collects the telemetry information identified/requested by the example configuration file and transmits the telemetry information and a secret to the example analytics analyzer 130 via the example network 120. The example analytics analyzer 130 utilizes a previously trained model to analyze the telemetry information (e.g., to determine if the telemetry information indicates an error, problem, misconfiguration, etc.) and generate a result. The example analytics service 114 polls the analytics analyzer 130 providing the secret. When the result is available, the analytics service 114 is notified in response to the polling with the secret. The analytics service 114 retrieves the result. In the meantime, the telemetry information is also stored for use in the next batch analysis (e.g., to retrain the model).

Figure 2:
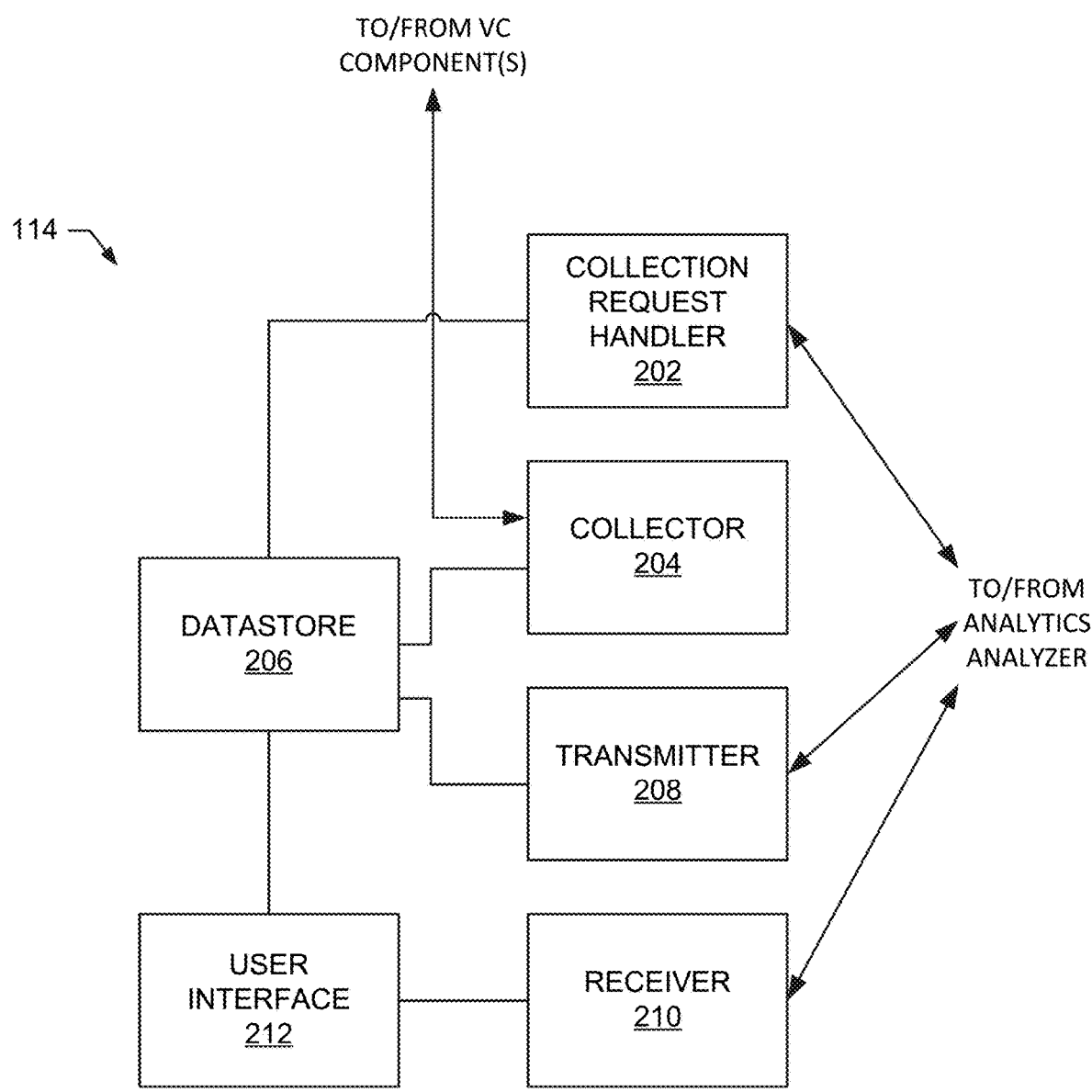
FIG. 2 is a block diagram of an example implementation of the analytics service of the cloud computing environment of FIG. 1.

FIG. 2 is a block diagram of an example implementation of the example analytics service 114 of FIG. 1. The example analytics service 114 of FIG. 2 includes an example collection request handler 202, an example collector 204, an example datastore 206, an example transmitter 208, an example receiver 210, and an example user interface 212.

The example collection request handler 202 retrieves a configuration file and stores the configuration information in the example datastore 206. The collection handler 202 of the illustrated example retrieves the configuration file from the example analytics analyzer 130 of FIG. 1. Alternatively, the collection request handler 202 may retrieve the configuration file from another source and/or may present a user interface for a user to input configuration information to specify the telemetry information to be collected by the example collector 204.

The example collector 204 retrieves the configuration file from the example datastore 206 to determine what telemetry information is to be collected. Based on the configuration file, the example collector 204 interfaces with the example virtual computing component(s) 112 and/or any other software and/or hardware components to collect telemetry information. For example, the analytics service 114 may be integrated into the virtual computing component 112 to collect the telemetry information, may access an application programming interface (API) of the virtual computing component 112, etc. The example collector 204 stores the collected telemetry information in a structured format (e.g., CDF/JSON) in the example datastore 206.

The example datastore 206 is a storage device (e.g., a physical storage device and/or a virtual storage device). Alternatively, the datastore 206 may be any type of storage device and/or structure (e.g., a database, a file, a folder, a storage disk, storage memory, etc.).

The example transmitter 208 collects telemetry information stored in the example datastore 206 and transmits the telemetry information to the example analytics analyzer 130 via the example network 120. For example, the transmitter 208 may include a wired and/or wireless network interface. According to the illustrated example, the transmitter 208 transmits a secret stored in the datastore 206 to the analytics analyzer 130 with the telemetry information. For example, the secret may be unique to the example analytics service 114 to enable the analyzers analyzer 130 to segregate telemetry information and results to ensure privacy of the data.

The example receiver 210 polls the example analytics analyzer 130 using the secret to determine if analysis results are available. When the analysis results are available, the example receiver 210 retrieves the analysis results from the example analytics analyzer 130. The example receiver 210 provides the analysis results to the user interface 212. Alternatively, the receiver 210 may store the analysis results in the example datastore 206.

The example user interface 212 of FIG. 2 outputs a display of the analysis results. In some examples, the user interface 212 may additionally retrieve telemetry information from the datastore 206 (e.g., the telemetry information that was analyzed to generate the analysis results).

While an example manner of implementing the analytics service 114 of FIG. 1 is illustrated in FIG. 2, one or more of the elements, processes and/or devices illustrated in FIG. 2 may be combined, divided, re-arranged, omitted, eliminated and/or implemented in any other way. Further, the example collection request handler 202, the example collector 204, the example datastore 206, the example transmitter 208, the example receiver 210, the example user interface 212 and/or more generally, the example analytics service 114 of FIG. 2 may be implemented by hardware, software, firmware and/or any combination of hardware, software and/or firmware. Thus, for example, any of the example collection request handler 202, the example collector 204, the example datastore 206, the example transmitter 208, the example receiver 210, the example user interface 212 and/or more generally, the example analytics service 114 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example collection request handler 202, the example collector 204, the example datastore 206, the example transmitter 208, the example receiver 210, the example user interface 212 and/or more generally, the example analytics service 114 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example analytics service 114 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
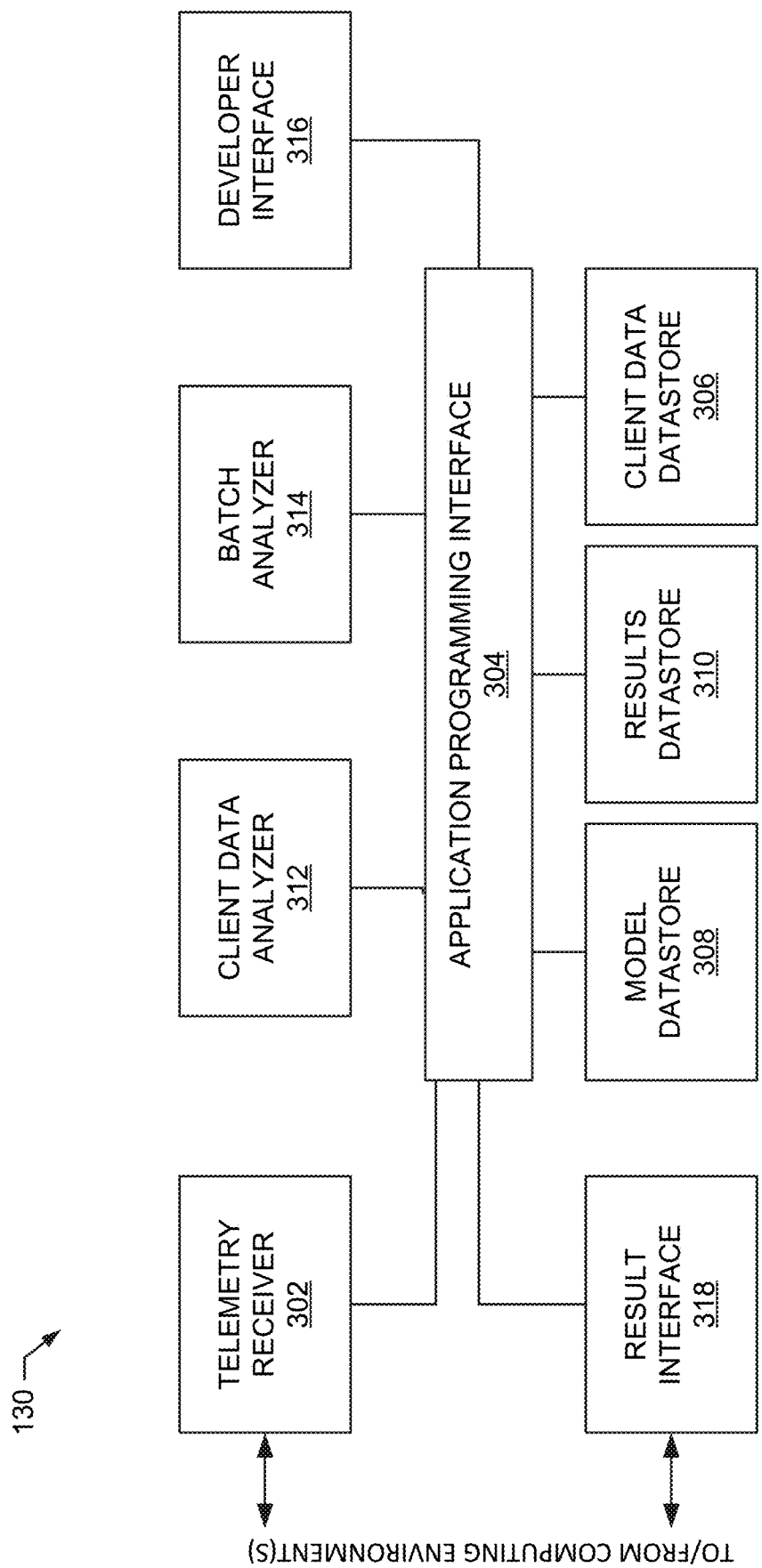
FIG. 3 is a block diagram of an example implementation of the analytics analyzer of FIG. 1.

FIG. 3 is a block diagram of an example implementation of the analytics analyzer 130 of FIG. 1. The example analytics analyzer 130 of FIG. 2 includes an example telemetry receiver 302, an example application programming interface 304, an example client data datastore 306, an example model datastore 308, an example results datastore 310, an example client data analyzer 312, an example batch analyzer 314, an example developer interface 316, and an example result interface 318.

The example telemetry receiver 302 is a network interface that receives telemetry data from the example analytics service 114. The telemetry receiver 302 of the illustrated example stores the received telemetry data in the example client data datastore 306 via the application programming interface 304. According to the illustrated example, the telemetry receiver 302 parses the data from the structured telemetry data to generate key-value pairs and stores the key-value pairs with any secret that is received from the analyzers service 114. The telemetry receiver 302 of the illustrated example is a web interface that receives hypertext transport protocol (HTTP) requests and posts. Alternatively, the telemetry receiver 302 may be any other type of interface.

The example application programming interface 304 is a representational state transfer (REST) API that facilitates storage and retrieval of data from the example client data datastore 306, the example model datastore 308, and the example results datastore 310. Alternatively, the application programming interface 304 may implement any other type of API. In some examples, the analytics analyzer 130 may not include an application programming interface and the databases may be accessed directly.

The example client data datastore 306 is a database for storing received telemetry data for processing by the client data analyzer 312 and the batch analyzer 314. The example model datastore 308 is a database for storing models (e.g., machine learning models) generated by the example batch analyzer 314. The example results datastore 310 is a database for storing analysis results from the example client data analyzer 312. While the example client data datastore 306, the example model datastore 308, and the example results datastore 310 are databases in the illustrated example, one or more of the client data datastore 306, the model datastore 308, and the results datastore 310 may be implemented by any type of datastore and/or data structure.

The example client data analyzer 312 is an application that processes telemetry data received from the example analyzers service 114. The example client data analyzer 312 retrieves new telemetry data from the example client data datastore, analyzes the data using a model retrieved from the example model datastore 308, and stores the results in the results datastore 310 in association with a secret of the analyzer service 114 (if one was received). The example client data analyzer may be implemented by a set of applications that are focused on particular analyses (e.g., applications that analyze telemetry data from particular ones of the virtual computing components 112). For example, the client data analyzer 312 may include an application that analyzes data for a virtual storage area network one of the virtual computing components 112.

According to the illustrated example, the client data analyzer 312 processes received data quickly to reduce latency (e.g., in under 1 second, in under 1 minutes, in under 1 hour, etc.). To provide a rapid response, the example client data analyzer 312 performs streaming analysis on received telemetry data. In other words, the client data analyzer 312 analyzes a package of telemetry data as it is received instead of bundling telemetry data over time. Alternatively, the client data analyzer 312 may collect telemetry data for a period of time (e.g., telemetry data from a single analytics service 114, telemetry data from a plurality of analytics services 114 associated with a single entity, etc.).

The example batch analyzer 314 retrieves stored telemetry data from the example client data datastore 306 and analyzes the data to train a model (e.g., a machine learning model). For example, the model may be a predictor model (e.g., to predict an error condition, a misconfiguration condition, etc.) may be a detector model (e.g., to indicate a current error condition, to indicate a current misconfiguration, etc.), or any other type of model. According to the illustrated example, the batch analyzer 314 analyzes telemetry data collected over a period of time (e.g., an hour, a day, a week, or any other shorter or longer period of time) and collected from a plurality of analytics services 114 (e.g., a plurality of analytics services 114 from a single entity, a plurality of analytics services 114 associated with a plurality of entities, etc.). Because the example batch analyzer 314 is not relied upon for real-time results, the batch analyzer 314 can perform a more detailed analysis and operate on a larger amount of data than the example client data analyzer 312.

According to the illustrated example, the batch analyzer 314 stores a generated/trained/re-trained model in the example model datastore 308 via the application programming interface 304 for retrieval by the example client data analyzer 312.

The developer interface 316 of the illustrated example provides an interface for querying the telemetry data stored in the example client data datastore 306 and/or analysis results stored in the example results datastore. The example developer interface 316 includes user level security to control access to the information. According to the illustrated example, the developer interface 316 provides a first security level that provides access to anonymized information and a second security level that provides access to information that identifies the source (e.g., the source of the telemetry data). For example, the developer interface 316 may be accessed by developers of the virtual computing components 112, which may be provided with anonymized information that allows for the developers to understand how the virtual computing components 112 are operating in the field. Users at a higher level (e.g., management, customer service, etc.) may be provided with permissions that allow access to information with identification information included.

In one example scenario, a developer of a virtual storage area networking virtual computing component 112 may analyze operation information to determine hardware compatibility by querying the client data datastore 306 and the results datastore 310 for information about computing environments 110 that include a particular piece of hardware for which compatibility information is desired. The results datastore 310 may reveal that installations that include the particular piece of hardware are experiencing greater number of errors, reducing performance, etc., thus, indicating incompatibility.

The example result interface 318 receives polling queries from the example analytics service 114, determines if relevant results are stored in the example results datastore 310 via the example application programming interface 304, and returns the results to the example analytics service 114. According to the illustrated example, the analytics service 114 provides a secret when polling and the result interface 318 only returns results that are stored with a matching secret in the example results datastore 310.

The example result interface 318 provides a configuration file for retrieval by the example analytics service. For example, the configuration file may be configured by developers (e.g., via a user interface provided by the example developer interface 316 and stored in the example results datastore 310. The example analytics service 114 may periodically check for an updated configuration file that instructs the analytics service 114 about what telemetry data to collect.

While an example manner of implementing the analytics analyzer 130 of FIG. 1 is illustrated in FIG. 3, one or more of the elements, processes and/or devices illustrated in FIG. 3 may be combined, divided, re-arranged, omitted, eliminated and/or implemented in any other way. Further, the example telemetry receiver 302, the example application programming interface 304, the example client data datastore 306, the example model datastore 308, the example results datastore 310, the example client data analyzer 312, the example batch analyzer 314, the example developer interface 316, the example result interface 318 and/or, more generally, the example analytics analyzer 130 of FIG. 1 may be implemented by hardware, software, firmware and/or any combination of hardware, software and/or firmware. Thus, for example, any of the example telemetry receiver 302, the example application programming interface 304, the example client data datastore 306, the example model datastore 308, the example results datastore 310, the example client data analyzer 312, the example batch analyzer 314, the example developer interface 316, the example result interface 318 and/or, more generally, the example analytics analyzer 130 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example telemetry receiver 302, the example application programming interface 304, the example client data datastore 306, the example model datastore 308, the example results datastore 310, the example client data analyzer 312, the example batch analyzer 314, and/or the example developer interface 316 is/are hereby expressly defined to include a non-transitory computer readable storage device or storage disk such as a memory, a digital versatile disk (DVD), a compact disk (CD), a Blu-ray disk, etc. including the software and/or firmware. Further still, the example analytics analyzer 130 of FIG. 1 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
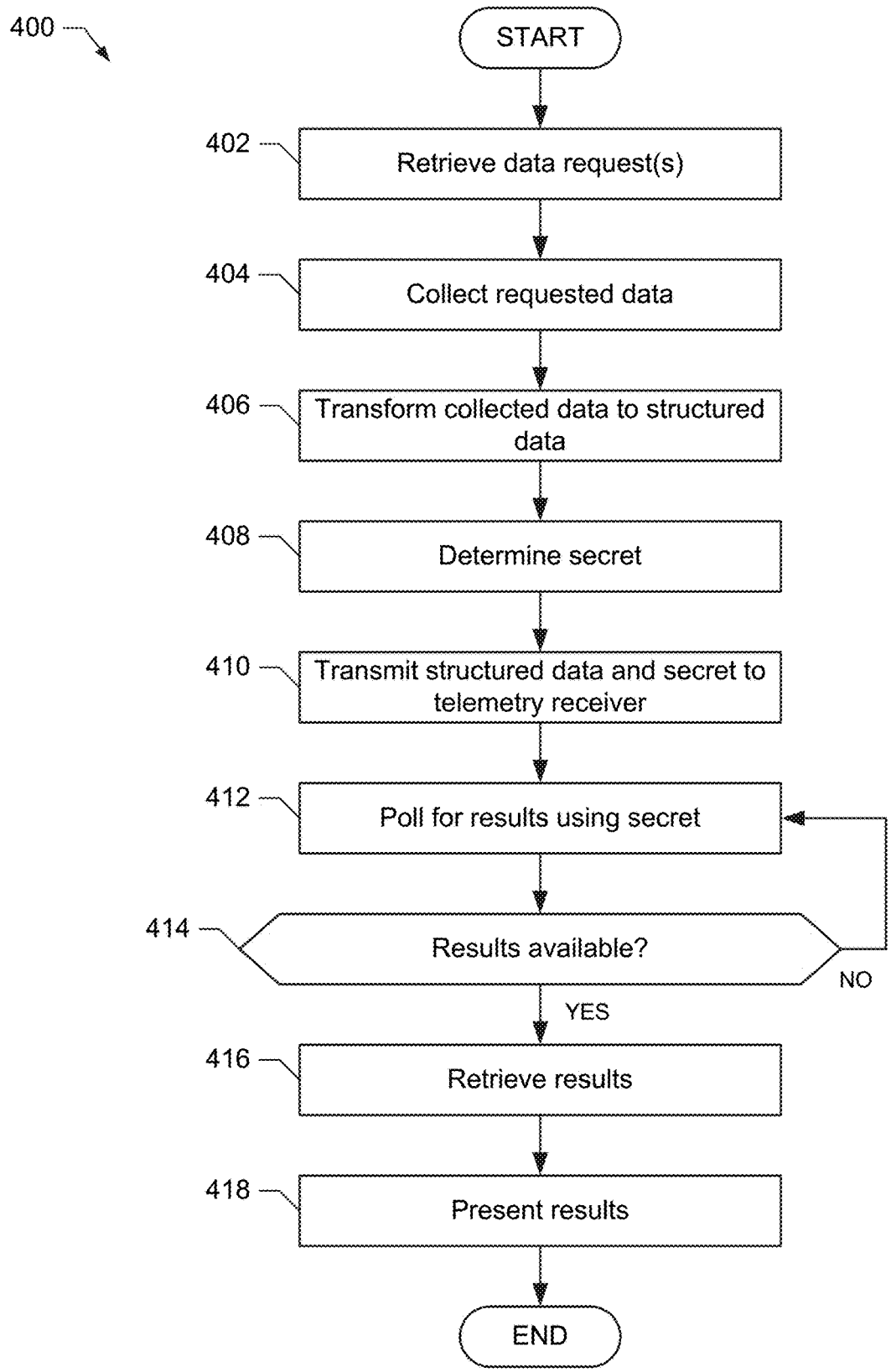
FIG. 4 is a flowchart representative of machine readable instructions which may be executed to implement the example analytics service of FIG. 1 and/or FIG. 2.

A flowchart representative of example hardware logic or machine readable instructions for implementing the analytics service 114 of FIG. 1 and/or FIG. 2 is shown in FIG. 4. The machine readable instructions may be a program or portion of a program for execution by a processor such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIG. 4, many other methods of implementing the example analytics service 114 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The program 400 of FIG. 4 begins at block 402 when the example collection request handler 202 retrieves a configuration file with data request(s) information from the example analytics analyzer 130. The example collector 204 collects the telemetry data requested by the configuration file from the example virtual computing components 112 (block 404). The example collector 204 transforms the collected telemetry data into structured data and stores the data in the example datastore 206 (block 406).

The example transmitter 208 then determines a secret associated with the example analytics service 114 (block 408). For example, the secret may be stored in the datastore 206, may be input by a user, etc.

The example transmitter 208 then transmits the structured data and the secret to the telemetry receiver 302 of the example analytics analyzer 130 (block 410). After the transmitter 208 transmits the data, the example receiver 210 transmits a polling request to the analytics analyzer 130 using the secret (block 412). The example receiver 210 determines if a response indicates that results are available (block 414). If the response indicates that results are not yet available, control returns to block 412 to poll for the request again (e.g., after a period of time has passed (e.g., a second, a minute, etc.)).

If the polling indicates that results are available (block 414), the example receiver 210 retrieves the results (block 416). The example user interface 212 then presents the results (block 418). For example, the user interface 212 may present an alert if the results indicate an error condition, may present a recommendation (e.g., an upgrade is recommended, a hardware replacement is recommended, a configuration change is recommended, etc.).

The example process of FIG. 4 then ends. Alternatively, control may return to block 402 to periodically check for a new configuration file, control may return to block 404 to collect additional telemetry data, and/or control may return to block 412 to poll for another set of results.

Figure 5:
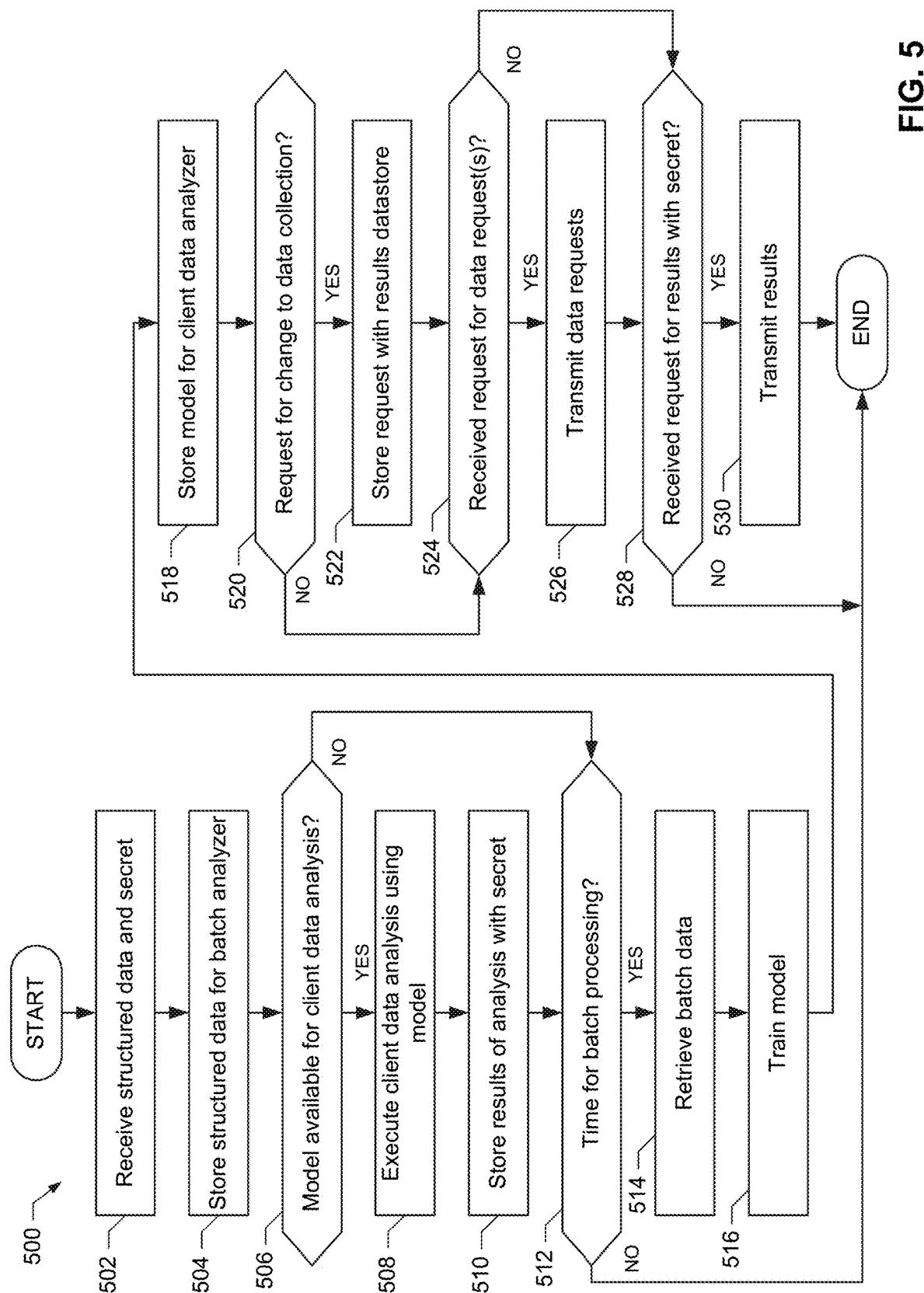
FIG. 5 is a flowchart representative of machine readable instructions which may be executed to implement the example analytics analyzer of FIG. 1 and/or FIG. 3.

A flowchart representative of example hardware logic or machine readable instructions for implementing the analytics analyzer 130 of FIG. 1 and/or FIG. 3 is shown in FIG. 5. The machine readable instructions may be a program or portion of a program for execution by a processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 5, many other methods of implementing the example analytics analyzer 130 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The program 500 of FIG. 5 begins at block 502 when the example telemetry receiver 302 receives structured data and a first secret (block 502). The example telemetry receiver 302 stores the structured data in association with the first secret in the example client data datastore 306 via the example application programming interface 304 (block 504).

The example client data analyzer 312 determines if a model is available for client data analysis (block 506). When a model is not available, control proceeds to block 512, which is described below. When a model is available, the example client data analyzer 312 retrieves the received telemetry data from the example client data datastore 306 and the model from the example model datastore 308 via the example application programming interface 304 and executes a client data analysis on the telemetry data using the model (block 508). For example, the client data analyzer 312 may select a model associated with the source of the telemetry data. The model may be a machine learning model which the client data analyzer 312 applies to the telemetry data to determine a result (e.g., to determine an error prediction, to determine a configuration error, to determine a hardware compatibility issue, to confirm stable operation, etc.).

The example client data analyzer 312 stores the analysis results in association with the first secret associated with the telemetry data in the example results datastore 310 (block 510).

The example batch analyzer 314 determines if it is time for batch processing to be performed (block 512). For example, batch processing may be performed in response to determining that a model is needed, to determining that a model has reached a threshold age, to determining that a threshold amount of new telemetry data has been received, to determining that a time has elapsed, to determining that a trigger time has arrived, etc. When it is not time for batch processing the process of FIG. 5 ends or control returns to block 502 to await further telemetry data.

When it is time for batch processing (block 512), the example batch analyzer 314 retrieves stored data from the example client data datastore 306 (block 514). For example, the stored data may include telemetry data that has been previously analyzed by the example client data analyzer 312. The data may be data from a single entity or a plurality of entities. For example, when attempting to identify hardware compatibility issues, it may be helpful to analyze data from many entities to increase the number of instances of a particular hardware configuration and to reduce the possibility of issues that are unique to a configuration configured by a single entity.

The example batch analyzer 314 trains a model using the retrieved batch data (block 516). For example, the training may be unsupervised training to identify clusters, may be supervised training using labeled data (e.g., data that is labeled with error conditions that are detected by the analytics service 114 and/or identified by users), or any other type of training. The example training may generate a new model, train an existing model, re-train an existing model (e.g., replace the model rather than update the model), etc.

After training the model (block 516), the example batch analyzer 314 stores the model, for use by the example client data analyzer 312, in the example model datastore 308 via the example application programming interface 304 (block 518).

The example result interface 318 determines if a request for a change to data collections has been received (block 520). For example, a developer may submit a request via the developer interface 316 for addition or alternative data to be collected in the telemetry data by the example analytics service 114. When there are no requested changes, control proceed to block 524. When a request for changes is received, the example results datastore 310 stores the data request (e.g., updates a configuration file that is retrieved by the example analytics service 114) (block 522).

The example result interface 318 determines if a request has been received for data request information (e.g., for the configuration file) (block 524). When a request has not been received, control proceeds to block 528). When a request has been received, the example result interface 318 retrieves the configuration file identifying data request information from the example results datastore 310 and transmits the configuration file to the source of the request (block 526).

The example result interface 318 determines if a request for analysis results has been received with a second secret (block 528). When a request has not been received, the process of FIG. 5 terminates or control returns to another block to continue processing. When a request has been received, the example result interface 318 retrieves results associated with the identified second secret (e.g., the results associated with the first secret when the result interface 318 determines that the second secret matches the first secret) and transmits the results to the source of the request (block 530). The process of FIG. 5 then terminates or control returns to another block to continue processing.

As mentioned above, the example processes of FIGS. 4-5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

Figure 6:
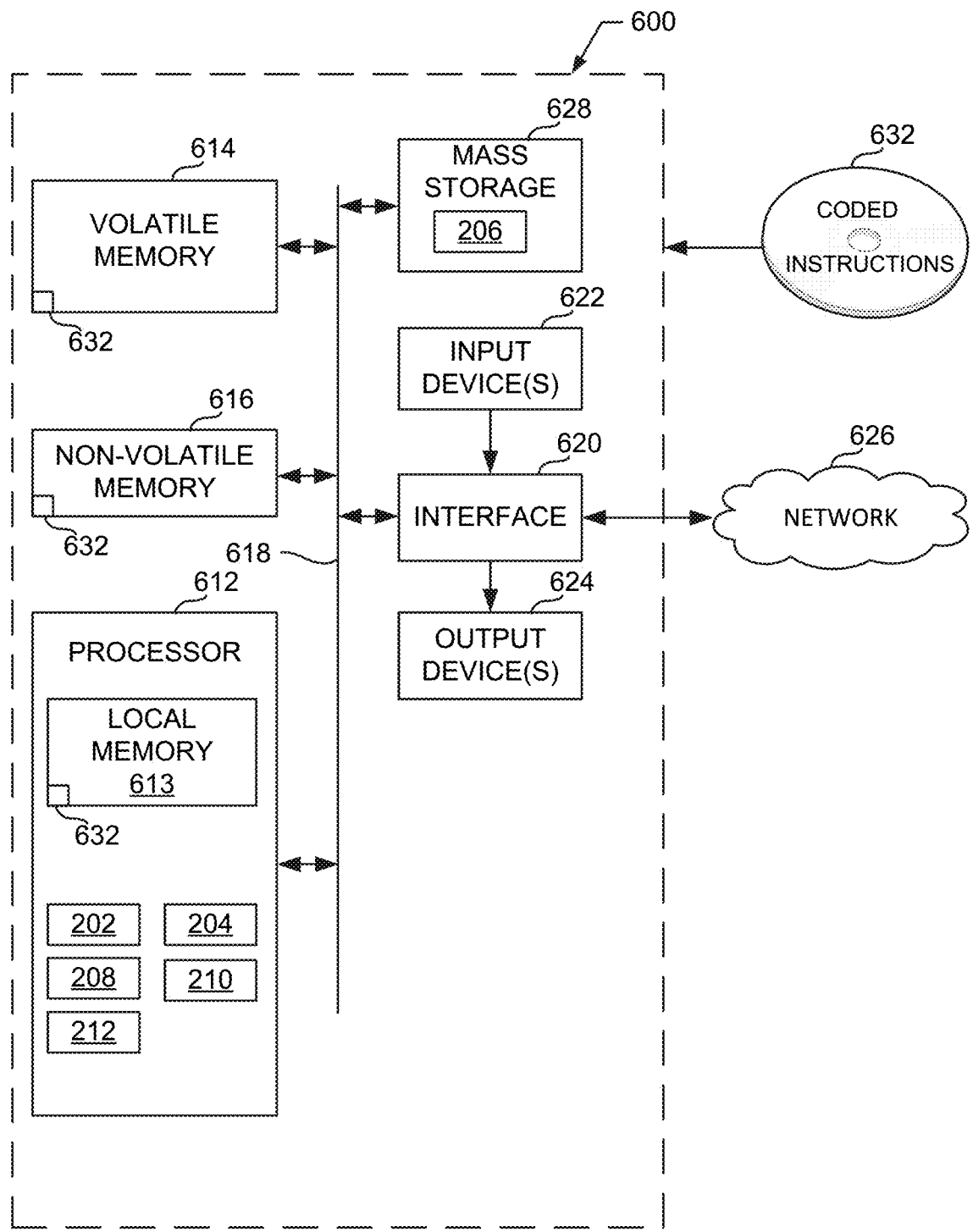
FIG. 6 is a block diagram of an example processing platform structured to execute the instructions of FIG. 4 to implement the example analytics service of FIG. 1 and/or FIG. 2.

FIG. 6 is a block diagram of an example processor platform 600 structured to execute the instructions of FIG. 4 to implement the analytics service 114 of FIG. 1 and/or FIG. 2. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example collection request handler 202, the example, collector 204, the example transmitter 208, the example receiver 210, and the example user interface 212.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives. The example mass storage 628 includes the example datastore 206.

The machine executable instructions 632 of FIG. 4 may be stored in the mass storage device 628, in the volatile memory 614, in the non-volatile memory 616, and/or on a removable non-transitory computer readable storage medium such as a CD or DVD.

Figure 7:
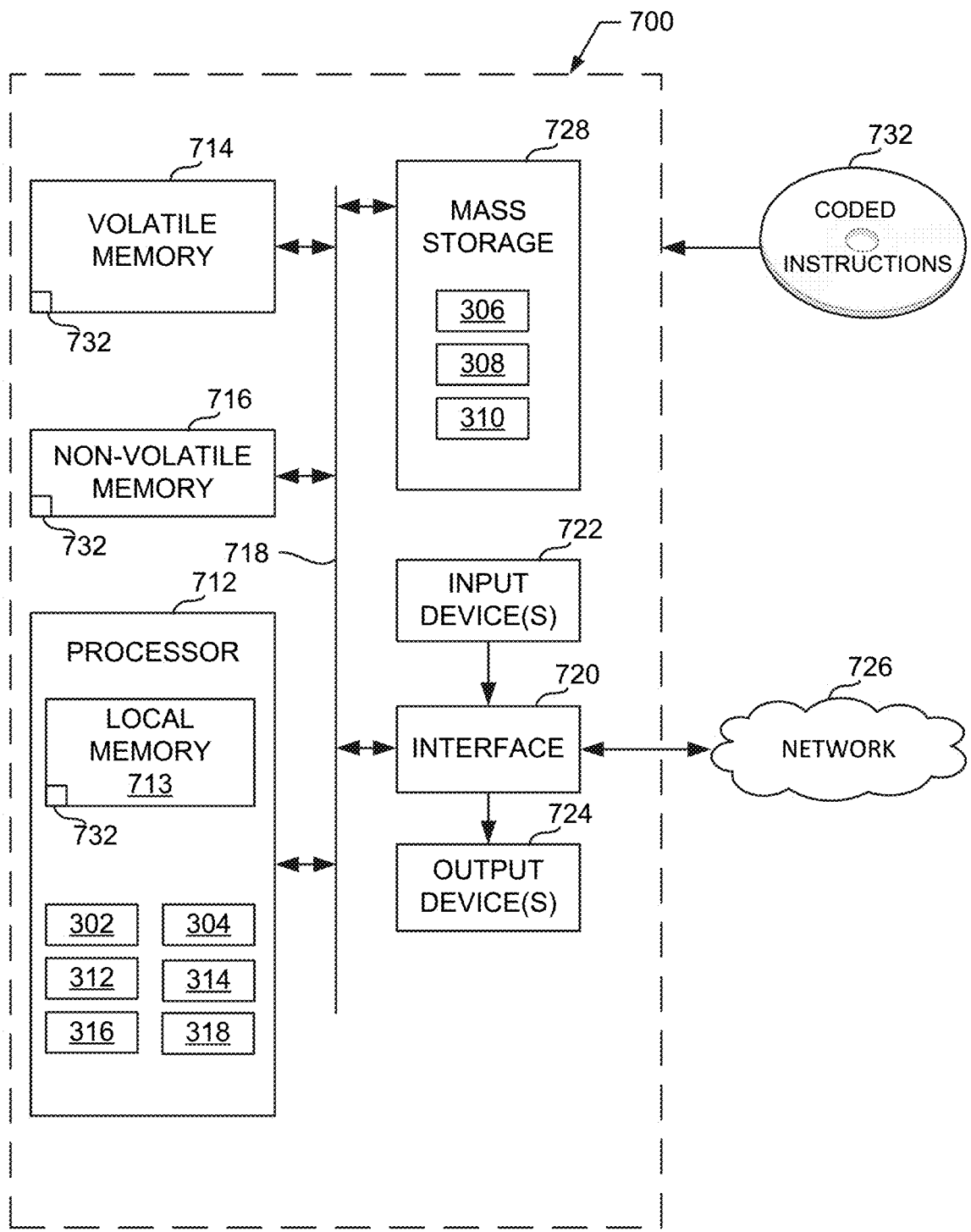
FIG. 7 is a block diagram of an example processing platform structured to execute the instructions of FIG. 5 to implement the example analytics analyzer of FIG. 1 and/or FIG. 3.

FIG. 7 is a block diagram of an example processor platform 700 structured to execute the instructions of FIG. 5 to implement the analytics analyzer 130 of FIG. 1 and/or FIG. 3. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example telemetry receiver 302, the example application programming interface 304, the example client data analyzer 312, the example batch analyzer 314, the example developer interface 316, and the example result interface 318.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIG. 5 may be stored in the mass storage device 728, in the volatile memory 714, in the non-volatile memory 716, and/or on a removable non-transitory computer readable storage medium such as a CD or DVD.

From the foregoing, it will be appreciated that example methods, apparatus and articles of manufacture have been disclosed that improve analysis, troubleshooting, and develop of components of computing environments. In some examples disclosed herein, the security of transmitting telemetry data that may include private, secret, and/or sensitive information is improved by associating the telemetry data with a secret that is associated with the telemetry data and any results generated therefrom. Accordingly, data security is maintained by requiring that the correct secret be sent with requests for the telemetry data and/or the analysis results. In some examples, a positive user experience is maintained by providing rapid (e.g., streaming) analysis results to the user using the client data analyzer that operates on a received telemetry data package. Meanwhile, a more complex analysis of the telemetry data may be performed in parallel with the streaming analysis to analyze larger sets of telemetry data and to train an analysis model.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a client data datastore to store first telemetry data and a first secret, the first telemetry data and the first secret received from first a virtual computing component operating within a virtual computing environment;
a client data analyzer to:
apply an analysis model to the first telemetry data to determine an analysis result; and
store the analysis result in association with the first secret; and
a result interface to, in response to a request including a second secret:
retrieve the stored analysis result associated with the first secret that matches the second secret;
transmit the stored analysis result to a source of the request; and
a batch analyzer to re-train the analysis model using the first telemetry data and second telemetry data from a second virtual computing environment and provide the re-trained analysis model to the client data analyzer for use in analyzing incoming telemetry data.

2. An apparatus as defined in claim 1, further including:
a client data datastore to store the first telemetry data, the first secret, and second telemetry data,
a model datastore to store the analysis model, and
a results datastore to store the analysis result and the first secret.

3. An apparatus as defined in claim 1, further including a result interface to receive a request to poll available analysis results and the second secret.

4. An apparatus as defined in claim 3, wherein the result interface is to retrieve the analysis result when the second secret matches the first secret stored with the analysis result.

5. An apparatus as defined in claim 1, wherein the result interface is to transmit a configuration file to the virtual computing environment, the configuration file to identify information to be collected by the virtual computing environment from the virtual computing component and transmitted with the first telemetry data.

6. An apparatus as defined in claim 1, wherein the first telemetry data includes a performance metric about operation of the virtual computing component and an indication of a configuration of the virtual computing component.

7. An apparatus as defined in claim 1, wherein the first secret is at least one of a password, a certificate, or a pre-shared key.

8. A non-transitory computing readable medium comprising instructions that, when executed, cause a machine to at least:
store first telemetry data and a first secret, the first telemetry data and the first secret received from first a virtual computing component operating within a virtual computing environment;
apply an analysis model to the first telemetry data to determine an analysis result; and
store the analysis result in association with the first secret; and
in response to a request including a second secret:
retrieve the stored analysis result associated with the first secret that matches the second secret;
transmit the stored analysis result to a source of the request; and
re-train the analysis model using the first telemetry data and second telemetry data from a second virtual computing environment and provide the re-trained analysis model for use in analyzing incoming telemetry data.

9. A non-transitory computing readable medium as defined in claim 8, wherein the instructions, when executed, cause the machine to:
store the first telemetry data, the first secret, and second telemetry data;
store the analysis model; and
store the analysis result and the first secret.

10. A non-transitory computing readable medium as defined in claim 8, wherein the instructions, when executed, cause the machine to receive a request to poll available analysis results and the second secret.

11. A non-transitory computing readable medium as defined in claim 10, wherein the instructions, when executed, cause the machine to retrieve the analysis result when the second secret matches the first secret stored with the analysis result.

12. A non-transitory computing readable medium as defined in claim 8, wherein the instructions, when executed, cause the machine to transmit a configuration file to the virtual computing environment, the configuration file to identify information to be collected by the virtual computing environment from the virtual computing component and transmitted with the first telemetry data.

13. A non-transitory computing readable medium as defined in claim 8, wherein the first telemetry data includes a performance metric about operation of the virtual computing component and an indication of a configuration of the virtual computing component.

14. A non-transitory computing readable medium as defined in claim 8, wherein the first secret is at least one of a password, a certificate, or a pre-shared key.

15. A method to process telemetry data in networked computing environments, the method comprising:
store first telemetry data and a first secret, the first telemetry data and the first secret received from first a virtual computing component operating within a virtual computing environment;
applying an analysis model to the first telemetry data to determine an analysis result; and
storing the analysis result in association with the first secret; and
in response to a request including a second secret:
retrieving the stored analysis result associated with the first secret that matches the second secret;
transmitting the stored analysis result to a source of the request; and
re-training the analysis model using the first telemetry data and second telemetry data from a second virtual computing environment and provide the re-trained analysis model for use in analyzing incoming telemetry data.

16. A method as defined in claim 15, further including storing the first telemetry data, the first secret, and second telemetry data, storing the analysis model, and storing the analysis result and the first secret.

17. A method as defined in claim 15, further including receiving a request to poll available analysis results and the second secret.

18. A method as defined in claim 15, further including retrieving the analysis result when the second secret matches the first secret stored with the analysis result.

19. A method as defined in claim 15, further including transmitting a configuration file to the virtual computing environment, the configuration file to identify information to be collected by the virtual computing environment from the virtual computing component and transmitted with the first telemetry data.

20. A method as defined in claim 15, wherein the first telemetry data includes a performance metric about operation of the virtual computing component and an indication of a configuration of the virtual computing component.

21. A method as defined in claim 15, wherein the first secret is at least one of a password, a certificate, or a pre-shared key.

\* \* \* \* \*